United States Patent Office 3,544,513
Patented Dec. 1, 1970

---

3,544,513
COMPOSITION AND PROCESS FOR THE PREPARATION OF ORGANOSILICON ELASTOMERS
Marcel Lefort, Caluire, and Parasko Nicou, Lyon, France, assignors to Rhone-Poulenc S.A., Paris, France, a French body corporate
No Drawing. Filed Aug. 14, 1968, Ser. No. 752,469
Claims priority, application France, Aug. 22, 1967, 118,628
Int. Cl. C08f *11/04*
U.S. Cl. 260—46.5                  16 Claims

ABSTRACT OF THE DISCLOSURE

Organosilicon elastomers may be made by curing linear organosiloxanes containing alkenyl groups with oxaziridines.

---

The present invention relates to the preparation of organosilicon elastomers by vulcanisations of essentially linear organopolysiloxanes containing alkenyl groups.

It is known to produce organosilicon elastomers from diorganopolysiloxanes which may or may not contain alkenyl groups, using organic peroxides as vulcanisation agents. The latter simultaneously act on the alkenyl or alkyl groups distributed along the polysiloxane chains to form bridges between the various polymer chains. This is in certain cases a not insignificant disadvantage because it is known that the mechanical properties of elastomers are greatly influenced by the relative positions, and especially the frequency and spacing, of the bridges between the polymer chains. Another disadvantage inherent in the use of organic peroxides lies in the fact that they cause the formation of by-products which deleteriously affect the mechanical properties of the resulting elastomers.

The present invention provides compositions comprising an essentially linear organopolysiloxane containing at least one alkenyl group per molecule and an oxaziridine, and a process for the preparation of organosilicon elastomers which comprises heating such compositions.

The oxaziridines which may be used in the new process generally conform to the formula:

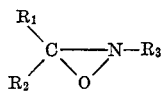

in which $R^1$, $R^2$ and $R^3$, which are identical or different, represent hydrogen or alkyl, cycloalkyl, aryl, or aralkyl radicals which are unsubstituted or substituted by groups or atoms which do not interfere with the vulcanisation, or $R^1$, $R^2$ and the carbon atom of the oxaziridine ring form a ring which is unsubstituted or substituted by one or more alkyl groups, or $R^1$ and $R^2$ together form a nitrogen-containing heterocyclic structure with $R^3$, and the nitrogen atom and carbon atom of the oxaziridine ring. These oxaziridines can be easily prepared by oxidation of imines with peracetic acid according to the method of Emmons J. Amer. Chem. Soc. 79, 5739–5754 (1957). Examples of $R^1$, $R^2$ and $R^3$ are methyl, ethyl, propyl, isopropyl, butyl, t-butyl, hexyl, isooctyl, cyclopropyl, cyclopentyl, cyclohexyl, methylcyclohexyl, cyclododecyl, phenyl, nitrophenyl, tolyl, xylyl, naphthyl, benzyl and phenylethyl, or $R^1$ and $R^2$ together may make up a radical such as cyclopentyl, cyclohexyl or methylcyclohexyl.

The most readily accessible oxaziridines whose use is preferred are those in which $R^1$ and $R^2$ are each hydrogen or lower alkyl (i.e. alkyl or 1 to 4 carbon atoms) or together form an alkylene chain, e.g. of 4 or 5 carbon atoms, and $R^3$ is lower alkyl, cycloalkyl, e.g. cyclohexyl, or phenyl. Examples of suitable oxaziridines are N-methyloxaziridine, dimethyl-N-isopropyloxaziridine, dimethyl-N-cyclohexyloxaziridine, N-cyclohexyloxaziridine, t-butyl-N-methyloxaziridine, methyl-ethyl - N - butyloxaziridine, methyl-ethyl - N - isopropyloxaziridine, methyl-ethyl-N-phenyloxaziridine, and p-nitrophenyl-N-ethyloxaziridine.

The organopolysiloxanes which can be vulcanised by the new process may be organosilicon compounds consisting essentially of units of the formulae:

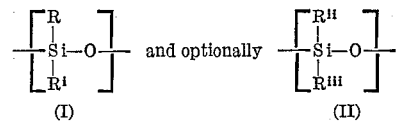

in which R and $R^i$, which may be identical or different, represent hydrogen or alkyl, cycloalkyl, aryl or aralkyl radicals, $R^{ii}$ has one of the significances given for R and $R^i$ or represents an alkenyl radical such as vinyl or allyl, and $R^{iii}$ is an alkenyl radical. Furthermore, R, $R^i$ or $R^{ii}$ may carry atoms or functional groups, for example nitrile groups or halogen atoms. These organopolysiloxanes may possess several identical or different units of Formulae I and II.

The chains of the organopolysiloxanes containing a plurality of units of Formulae I and II described above in general end in triorganosilyl groups of which the organic radicals, which may be identical or different, are the radicals R, $R^i$ and/or $R^{iii}$.

The organopolysiloxanes may also contain a small proportion of tri-functional groups of formula:

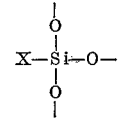

in which X represents R $R^i$ or $R^{iii}$, into the siloxane chains.

These organopolysiloxanes, consisting in the majority of cases of diorganopolysiloxanes of the oil or gum type, have in general a viscosity, measured at 25° C., of from 500 cp. to 30,000,000 cp., preferably from 20,000 cp. to 20,000,000 cp., and ordinarily contain on average one olefinic double bond per 100 to 1,500, preferably 250 to 1,000, silicon atoms.

Examples of such organopolysiloxanes are those in which R and $R^i$ are methyl, or methyl and phenyl, radicals, and $R^{ii}$ and $R^{iii}$ are respectively methyl and vinyl radicals, and especially those consisting of dimethylsiloxy chains terminated by dimethylvinylsiloxy or methyldivinyl-siloxy groups. The preferred organopolysiloxanes are thus those in which R and $R^i$ are each methyl or phenyl, $R^{ii}$ is methyl and $R^{iii}$ is vinyl, the end groups being one or two of the formulae:

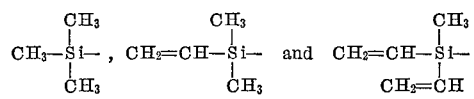

The preparation of these organopolysiloxanes is well known. It generally consists of subjecting one or more cyclic monomers, such as octamethylcyclotetrasiloxane, tetramethyltetraphenylcyclotetrasiloxane or octaphenylcyclotetrasiloxane, to the action of a polymerisation agent such as potassium hydroxide in the presence of a small quantity of an unsaturated cyclic monomer such as tetramethyltetravinylcyclotetrasiloxane, optionally with a chain-stopping agent. In this process the alkenyl groups are statistically distributed along the siloxane chain of the product.

The alkenyl groups may also be distributed in a more regular manner such as, for example, at the ends of the chain. To achieve this, it is possible ot work as stated above, without using the unsaturated cyclic monomer but using a chain stopping agent of the short chain polysiloxane type, containing at least one alkenyl group attached to each silicon atom, such as 1,3,5,7,9,11,13-heptavinyl-nonamethylheptasiloxane or 1,1,3,5,7,9,11,13,13-nonavinyl-heptamethylheptasiloxane.

The amount of oxaziridine employed essentially varies according to the number of double bonds present in the gun. As a general rule, and without imposing a limitation by these regulations, the use of 2 to 3 molecules of oxaziridine per olefinic double bond is suitable.

Though the oxaziridine may be used by itself, it is also possible to add to it certain activators such as metal salts, such as the alkanoates, of certain organic acids, for example iron octoate or manganese octoate.

The mixture containing the gum with alkenyl groups, the oxaziridine and optionally an activator usually contains various other ingredients, the use of which is well known to the specialist, added before vulcanisation. Amongst these there may more especially be mentioned fillers and especially fillers called reinforcing fillers such as silicas of combustion (fume silicas) or silica aerogels of large surface area, optionally treated with an organosilicon derivative.

Apart from these reinforcing fillers it is also possible to use, as fillers, crude ground silicas, ground quartz, alumina, titanium dioxide, calcium carbonate, graphite, carbon black, polyvinyl chloride or cork powder. It is also possible to add various pigments and so-called anti-structure substances such as dimethyl(tetramethylenedioxy)silane or short chain diorganopolysiloxanes containing hydroxyl groups.

The compositions obtained are storage-stable at ambient temperature and can be vulcanised by heating to a temperature which is preferably above 125° C., either under atmospheric pressure or under a higher pressure, generally 100 to 300 bars. The vulcanisation time varies with the temperature to which the composition is raised. By way of indication, it may be stated that on average it is from 10 to 20 minutes if this temperature is from 140 to 160° C. When the vulcanisation is ended it is preferable to follow it by a post-heating at 200–250° C., for (say) 1 to 20 hours, so as to impart better heat stability to the resulting elastomer.

The elastomers obtained by the new process possess excellent mechanical properties. They are especially distinguished by higher elongations at break and tear strengths than those obtained using peroxides as vulcanisation agents, the tensile strength being practically the same in both cases.

The examples which follow illustrate the invention. In these examples the Shore A hardness is determined according to standard ASTM D–676–49T and the tear strength according to standard ASTM D624–49T, specimen A. The strength and elongation at break are measured by means of dumbbell specimen $H_3$ as described in French standard AFNOR T–46002.

EXAMPLE 1

The following ingredients are incorporated by means of a roll mill into seven 100 g. fractions of a gum consisting of dimethylsiloxy units and methylvinylsiloxy units randomly distributed:

| | G. |
|---|---|
| Silica of combustion (fume silica), treated with octamethylcyclotetrasiloxane | 45 |
| Dimethyl(tetramethylethylenedioxy)silane | 1.75 |
| A mixture of the same gum with 3.7% of iron octoate | 0.4 |
| A mixture of the same gum and 1.8% of manganese octoate | 1.45 |

Each of the seven fractions have a vulcanising agent added to it as indicated below:

Vulcanising agent

Fraction:
1 ------ 0.85 g. of methylethyl-N-isopropyloxaziridine.
2 ------ 0.85 g. of isopropyl-N-t-butyloxaziridine.
3 ------ 0.85 g. of isopropyl-N-isopropyloxaziridine.
4 ------ 0.85 g. of dimethyl-N-isopropyloxaziridine.
5 ------ 1.8 g. of a 50% solution of 2,4-dichlorobenzoyl-peroxide in a silicone oil.
6 ------ 0.85 g. of methylethyl-N-cyclohexyloxaziridine.
7 ------ 0.85 g. of 3,3-pentamethylene-oxaziridine.

Each fraction is introduced into a flat mould 2 mm. deep and heated, for 15 minutes under a pressure of 150 bars, to 150° C. in the case of fractions 1, 2, 3, 4, 6 and 7 and to 125° C. in the case of fraction 5. The elastic sheets obtained are then post-heated at 200° or at 250° C. for 16 hours. The mechanical properties of the samples obtained from the various fractions are shown in the table below.

| | Elongation at break in percent | Tear strength in kg./cm. | Tensile strength in kg./cm. |
|---|---|---|---|
| Before post-heating—Fraction: | | | |
| 1 | 620 | 20 | 75 |
| 2 | 830 | 24 | 84 |
| 3 | 880 | 24 | 78 |
| 4 | 1,170 | 32 | 83 |
| 5 | 485 | 15 | 86 |
| 6 | 710 | 27 | 90 |
| 7 | 1,140 | 36 | 100 |
| After 16 hours at 250° C.— Fraction: | | | |
| 1 | 500 | 23 | 80 |
| 2 | 660 | 24 | 87 |
| 3 | 680 | 29 | 80 |
| 4 | 620 | 22 | 80 |
| 5 | 360 | 16 | 75 |
| 6 | 480 | 24 | 71 |
| After 16 hours at 200° C.— Fraction: | | | |
| 7 | 685 | 30 | 87 |

The superior properties of fractions 1, 2, 3, 4, 6 and 7 as compared with fraction 5, using a known vulcanising agent, are obvious.

The gum consisting of dimethylsiloxy units and methylvinylsiloxy units distributed at random was prepared as follows: 1000 g. of octamethylcyclotetrasiloxane, 2.3 g. of tetramethyltetravinylcyclotetrasiloxane and 0.75 g. of tetradecamethylhexasiloxane are copolymerised in a 2-litre reactor, at 150° C. for 4 hours in the presence of 0.01 g. of potassium hydroxide. At the end of the polymerisation, 5 litres of carbon dioxide are injected over the course of 5 minutes and the mixture is then stirred for 15 hours under a carbon dioxide atmosphere. 10 g. of precipitated silica are added and the mixture is malaxated at 25° C. for 1 hour, and then heated to 200° C. for 7 hours while malaxation is continued, and 250 litres per hour of nitrogen are simultaneously injected to remove volatile products. 850 g. of a gum, having a viscosity at 25° C. of 15,000,000 cp. and containing one olefinic double bond per 500 silicon atoms, are thus obtained.

EXAMPLE 2

100 g. of a gum having vinyl groups at the chain ends are vulcanised with 0.85 g. of methylethyl-N-isopropyl-oxaziridine after introducing the other ingredients indicated in Example 1, and following the procedure of the same example. The resulting elastomer has the following mechanical properties.

| | Hardness, Shore A | Tensile strength in kg./cm.² | Elongation at break in percent | Tear strength in kg./cm. |
|---|---|---|---|---|
| Before post-heating | 55 | 95 | 750 | 20 |
| After 16 hours post-heating at 250° C. | 62 | 80 | 630 | 24 |

The gum containing vinyl groups at the chain ends was prepared by copolymerisation of 1000 g. of octamethylcyclotetrasiloxane and 1.67 g. of 1,3,5,7,9,11,13- heptavinyl-nonamethylheptasiloxane as described in Example 1. The resulting gum has one olefinic double bond per 700 silicon atoms and its viscosity at 25° C. is 16,000,000 cp.

EXAMPLE 3

100 g. of a gum consisting of dimethylsiloxy, diphenylsiloxy, and methylvinylsiloxy units distributed at random are vulcanised with 0.85 g. of methylethyl-N-isopropyl-oxaziridine according to the procedure of Example 1, using the other ingredients indicated in that example. The resulting elastomer has the following mechanical properties:

| | Hardness, Shore A | Tensile strength in kg./cm.$^2$ | Elongation at break in percent | Tear strength in kg./cm. |
|---|---|---|---|---|
| Before post-heating, heating at 250° C. | 54 | 96 | 650 | 29 |
| After 16 hours post-heating at 250° C. | 64 | 84 | 480 | 24 |

The gum consisting of dimethylsiloxy, diphenylsiloxy and methylvinylsiloxy units distributed at random is obtained by heating 1000 g. of octamethylcyclotetrasiloxane, 2.3 g. of tetramethyltetravinylcyclotetrasiloxane, 0.75 g. of tetradecamethylhexasiloxane and 0.01 g. of potassium hydroxide at 150° C. At the end of one hour's heating, 150 g. of octaphenylcyclotetrasiloxane are introduced in small portions. The mixture is heated for 2 hours at 160° C., then for 2 hours at 200° C., and the process is finished by injecting carbon dioxide gas and heating to 200° C. under a nitrogen atmosphere after adding silica as described in Example 1. The resulting gum has one double bond per 500 silicon atoms and its viscosity at 25° C. is 20,000,000 cp.

We claim:
1. A vulcanisable composition comprising
(A) an essentially linear organo-polysiloxane containing at least one alkenyl group per molecule, which consists essentially of units of formula

$$\left[\begin{array}{c} R \\ | \\ -Si-O- \\ | \\ R^i \end{array}\right]$$

together with organosiloxane end groups in which R and $R^i$ are the same or different and are each a hydrogen atom or an alkyl, cycloalkyl, aryl or arlkyl radical or such a radical substituted with a halogen atom or nitrile group, and at least one of the organic radicals in the siloxane end groups is an alkenyl radical and the rest are alkyl, cycloalkyl, aryl, aralkyl or alkenyl radicals or such radicals substituted with a halogen atom or nitrile group, the viscosity of the organopolysiloxane, meaursed at 25° C., being from 500 cp. to 30,000,000 cp., and its average content of olefinic double bonds being 1 for each 100–1500 molecules, and
(B) an oxaziridine of the general formula $$\begin{array}{c} R^1 \\ \diagdown \\ C\text{———}N\text{—}R^3 \\ \diagup \quad \diagdown \diagup \\ R^2 \quad\quad O \end{array}$$

in which $R^1$, $R^2$ and $R^3$, which are the same or different, are hydrogen atoms or alkyl, cycloalkyl, aryl or aralkyl radicals or $R^1$ and $R^2$ and the carbon atom of the oxaziridine ring form a carbocyclic ring which is unsubstituted or substituted by alkyl.

2. Composition according to claim 1 wherein the oxaziridine has the formula:

$$\begin{array}{c} R^1 \\ \diagdown \\ C\text{———}N\text{—}R^3 \\ \diagup \quad \diagdown \diagup \\ R^2 \quad\quad O \end{array}$$

where $R^1$ and $R^2$ are each hydogen or lower alkyl or together form an alkylene chain and $R^3$ is lower alkyl, cycloalkyl, or phenyl.

3. Composition according to claim 1 wherein the proportion of the oxaziridine is such as to provide 2 to 3 molecules of oxaziridine for each olefinic double bond in the organopolysiloxane.

4. Composition according to claim 1 wherein the said organopolysiloxane has a viscosity, at 25° C., from 20,000 to 20,000,000 cp. and contains one vinyl group for every 250 to 1000 silicon atoms.

5. Composition according to claim 1 which also contains an iron or manganese alkanoate as activator.

6. Composition according to claim 1 wherein the said organopolysiloxane consists essentially of units of the formula:

$$\begin{array}{c} R \\ | \\ -Si-O- \\ | \\ R^i \end{array}$$

in which R and $R^1$ are each methyl or phenyl, with end groups of one or two of the formulae:

$$\begin{array}{ccc} CH_3 & CH_3 & CH_3 \\ | & | & | \\ CH_3-Si-, & CH_2=CH-Si- \text{ and } & CH_2=CH-Si- \\ | & | & | \\ CH_3 & CH_3 & CH_2=CH \end{array}$$

7. A vulcanisable composition comprising
(A) an essentially linear organopolysiloxane containing at least one alkenyl group per molecule, which consists essentially of units of formula $$\left[\begin{array}{c} R \\ | \\ -Si-O- \\ | \\ R^i \end{array}\right]$$

and units of formula $$\left[\begin{array}{c} R^{ii} \\ | \\ -Si-O- \\ | \\ R^{iii} \end{array}\right]$$

together with organosiloxane end groups, in which R and $R^i$ are the same or different and are each a hydrogen atom or an alkyl, cycloalkyl, aryl or aralkyl radical, or such a radical substituted with a halogen atom or nitrile group, $R^{ii}$ has one of the meanings of R and $R^i$ or is an alkenyl radical or such a radical substituted with a halogen atom or nitrile group, and $R^{iii}$ is an alkenyl radical, and in which the organo radicals of the end groups are one or more of the radicals represented by $R^i$, $R^{ii}$ and $R^{iii}$, the viscosity of the organopolysiloxane, measured at 25° C., being from 500 cp. to 30,000,000 cp., and its average content of olefinic double bonds being 1 for each 100–1500 molecules, and
(B) an oxaziridine of the general formula $$\begin{array}{c} R^1 \\ \diagdown \\ C\text{———}N\text{—}R^3 \\ \diagup \quad \diagdown \diagup \\ R^2 \quad\quad O \end{array}$$

in which $R^1$, $R^2$ and $R^3$, which are the same or different, are hydrogen atoms or alkyl, cycloalkyl, aryl or aralkyl radicals or $R^1$ and $R^2$ and the carbon atom of the oxaziridine ring form a carbocyclic ring which is unsubstituted or substituted by alkyl.

8. Composition according to claim 7 wherein the oxaziridine has the formula:

$$\begin{array}{c} R_1 \\ \diagdown \\ C\text{———}N\text{—}R^3 \\ \diagup \quad \diagdown \diagup \\ R_2 \quad\quad O \end{array}$$

wherein $R^1$ and $R^2$ are each hydrogen or lower alkyl or together form an alkylene chain and $R^3$ is lower alkyl, cycloalkyl, or phenyl.

9. Composition according to claim 7 wherein the proportion of the oxaziridine is such as to provide 2 to 3 molecules of oxaziridine for each olefinic double bond in the organopolysiloxane.

10. Composition according to claim 7 wherein the said organopolysiloxane consists essentially of units of the formula:

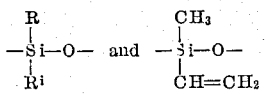

in which R and $R^i$ are each methyl or phenyl, with end groups of one or two of the formulae:

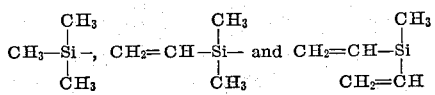

11. Composition according to claim 10 wherein the said organopolysiloxane has a viscosity, at 25° C., from 20,000 to 20,000,000 cp. and contains one vinyl group for every 250 to 1000 silicon atoms.

12. Composition according to claim 7 which also contains an iron or manganese alkanoate as activator.

13. Process for the preparation of an organosilicon elastomer which comprises heating at 125° to 250° C., a vulcanizable composition comprising
(A) an essentially linear organo-polysiloxane containing at least one alkenyl group per molecule, which consists essentially of units of formula

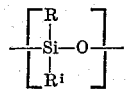

together with organosiloxane end groups in which R and $R^i$ are the same or different and are each a hydrogen atom or an alkyl, cycloalkyl, aryl or aralkyl radical or such a radical substituted with a halogen atom or nitrile group, and at least one of the organic radicals in the siloxane end groups is an alkenyl radical and the rest are alkyl, cycloalkyl, aryl, aralkyl or alkenyl radicals or such radicals substituted with a halogen atom or nitrile group, the viscosity of the organopolysiloxane, measured at 25° C., being from 500 cp. to 30,000,000 cp., and its average content of olefinic double bonds being 1 for each 100–1500 molecules, and
(B) an oxaziridine of the general formula

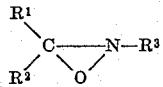

in which $R^1$, $R^2$ and $R^3$, which are the same or different, are hydrogen atoms or alkyl, cycloalkyl, aryl or aralkyl radicals or $R^1$ and $R^2$ and the carbon atom of the oxaziridine ring form a carbocyclic ring which is unsubstituted or substituted by alkyl.

14. Process according to claim 13 wherein the said composition is heated first at 140° to 160° C. for from 10 to 20 minutes and then at 200° to 250° C. for from 1 to 20 hours.

15. Process for the preparation of an organosilicon elastomer which comprises heating at 125° to 250° C., a vulcanizable composition comprising
(A) an essentially linear organopolysiloxane containing at least one alkenyl group per molecule, which consists essentially of units of formula

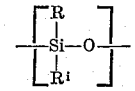

and units of formula

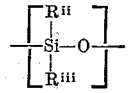

together with organosiloxane end groups, in which R and $R^i$ are the same or different and are each a hydrogen atom or an alkyl, cycloalkyl, aryl or aralkyl radical, or such a radical substituted with a halogen atom or nitrile group, $R^{ii}$ has one of the meanings of R and $R^i$ or is an alkenyl radical or such a radical substituted with a halogen atom or nitrile group, and $R^{iii}$ is an alkenyl radical, and in which the organo radicals of the end groups are one or more of the radicals represented by $R^i$, $R^{ii}$ and $R^{iii}$, the viscosity of the organopolysiloxane, measured at 25° C., being from 500 cp. to 30,000,000 cp., and its average content of olefinic double bonds being 1 for each 100–1500 molecules, and
(B) an oxaziridine of the general formula

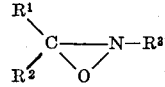

in which $R^1$, $R^2$ and $R^3$, which are the same or different, are hydrogen atoms or alkyl, cycloalkyl, aryl or aralkyl radicals or $R^1$ and $R^2$ and the carbon atom of the oxaziridine ring form a carbocyclic ring which is unsubstituted or substituted by alkyl.

16. Process according to claim 19 wherein the said composition is heated first at 140° to 160° C., for from 10 to 20 minutes and then at 200° to 250° C. for from 1 to 20 hours.

References Cited
UNITED STATES PATENTS 3,227,777   1/1966   Safford _____ 260—827
3,296,198   1/1967   Lukes _____ 260—46.5

DONALD E. CZAJA, Primary Examiner

M. I. MARQUIS, Assistant Examiner

U.S. Cl. X.R.

260—18, 37, 333, 448.2, 827